United States Patent [19]

Hacskaylo

[11] Patent Number: 5,138,162
[45] Date of Patent: Aug. 11, 1992

[54] METHOD AND APPARATUS FOR PRODUCING ENHANCED IMAGES OF CURVED THERMAL OBJECTS

[75] Inventor: Michael Hacskaylo, Falls Church, Va.

[73] Assignee: The United States of America as represented by the Secretary of the Army, Washington, D.C.

[21] Appl. No.: 292,026

[22] Filed: Dec. 16, 1988

[51] Int. Cl.⁵ .............................................. G02F 1/01
[52] U.S. Cl. ................................. 250/330; 244/3.16; 356/364; 356/369
[58] Field of Search ............... 250/225, 330; 244/3.16; 356/364, 369

[56] References Cited

U.S. PATENT DOCUMENTS

| | | | |
|---|---|---|---|
| 3,153,146 | 10/1964 | Lady | 250/330 |
| 4,333,008 | 6/1982 | Misek | 250/225 |
| 4,424,943 | 1/1984 | Zwirn et al. | 244/3.11 |

Primary Examiner—Mark Hellner
Attorney, Agent, or Firm—Milton W. Lee; Anthony T. Lane

[57] ABSTRACT

Curved thermal objects emit infrared energy with different ratios of ordinary-to-extraordinary polarizations compared to flat thermal objects. The invention takes advantage of this by taking the sum or difference of or between thermal images for two different polarization images of a scene. The curved objects are enhanced with respect to the remainder of the scene on a viewer.

4 Claims, 2 Drawing Sheets

METHOD AND APPARATUS FOR PRODUCING ENHANCED IMAGES OF CURVED THERMAL OBJECTS

The invention described herein may be manufactured, used, and licensed by the U.S. Government for governmental purposes without the payment of any royalties thereon.

BACKGROUND OF INVENTION

This invention is in the field of viewers for infrared radiation emitted by thermal bodies. there are various known types of infrared detectors which provide visible images, such as photovoltaic and photoresistive diodes and transistors, infrared vidicons, charged coupled devices, etc. These detectors have different complexities and uses, but all have difficulty in providing a recognizable image of a thermal object in defilade or clutter. One manner by which this difficulty is countered is the use of polarizers for object radiation incident on the detectors. It is a fact that thermal objects of different shapes emit (or reflect) thermal energy at different amounts for different polarizations. By choosing a particular polarization of incoming thermal energy, it is possible to increase the contrast between differently shaped bodies in a viewer. Unfortunately, using only a particular polarization decreases the total amount of infrared energy reaching the detector, for a particular infrared scene. Obviously, this degrades image quality. Moreover, background and clutter are not suppressed, whereas the instant invention does suppress such background or clutter while at the same time enhancing the images of curved objects such as tank gun barrels or turrets. U.S. Pat. No. 4,333,008 of Jun. 1, 1982 shows a system which uses alternate output pulses, having orthogonal polarizations, from a laser to illuminate a scene. Man-made specular objects reflect both polarizations, whereas natural objects act as diffuse reflectors; in any event, the reflected illumination is fed to two detectors, each responding to a different polarization. The differential sum of the detector outputs is high for specular objects and low for natural (non-specular) objects. This system does not give an overall image of the scene, but does indicate the presence of specular objects as the beam is manually swept over the scene.

SUMMARY OF THE INVENTION

The invention is a method for producing enhanced images of curved thermal objects in a field of other thermal objects, and an apparatus for practicing the method. The method consists of: obtaining thermal images of the field for different polarizations of the radiation therefrom, adding or subtracting pairs of images for different polarizations (preferably orthogonal) to produce an other image, and displaying this other image for a viewer. The apparatus includes means for performing these various functions or steps.

DETAILED DESCRIPTION OF INVENTION

Figure 1:
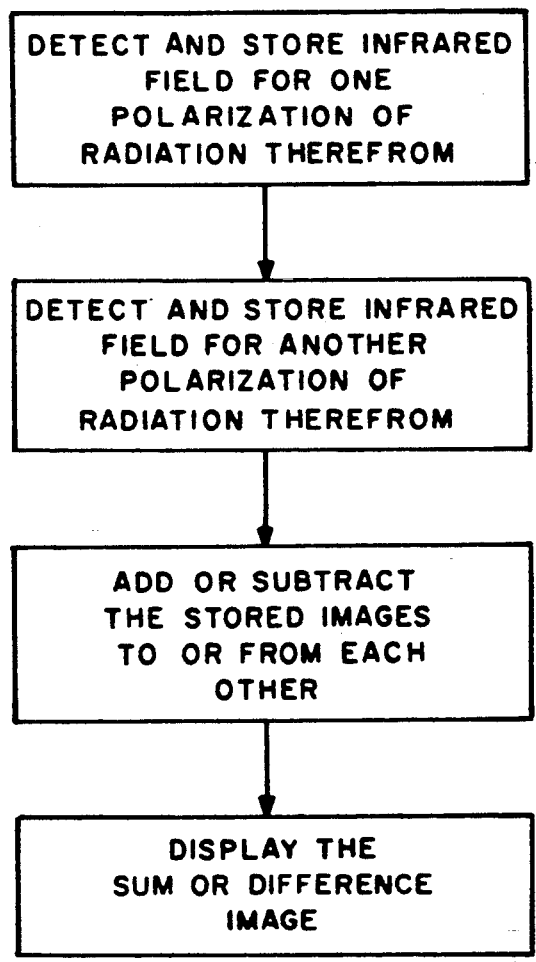
FIG. 1 shows a flow chart of the inventive method.

This invention may be best understood when this description is taken in conjunction with the drawings. The method proceeds as indicated in the flow chart of FIG. 1 and begins with detecting and storing a polarized field from a infrared scene. The next step is to detect another field of the same scene, but at a different polarization (preferably orthogonal to the previous polarization). The third step consists of adding or subtracting (pixel for pixel) the two stored fields to produce a sum or difference field. Finally, this last-mentioned field is displayed as a visible image to a viewer. If a summation is used, a curved surface is enhanced in the visible image; if subtraction is used, the edges of a curved surface are enhanced.

Figure 2:
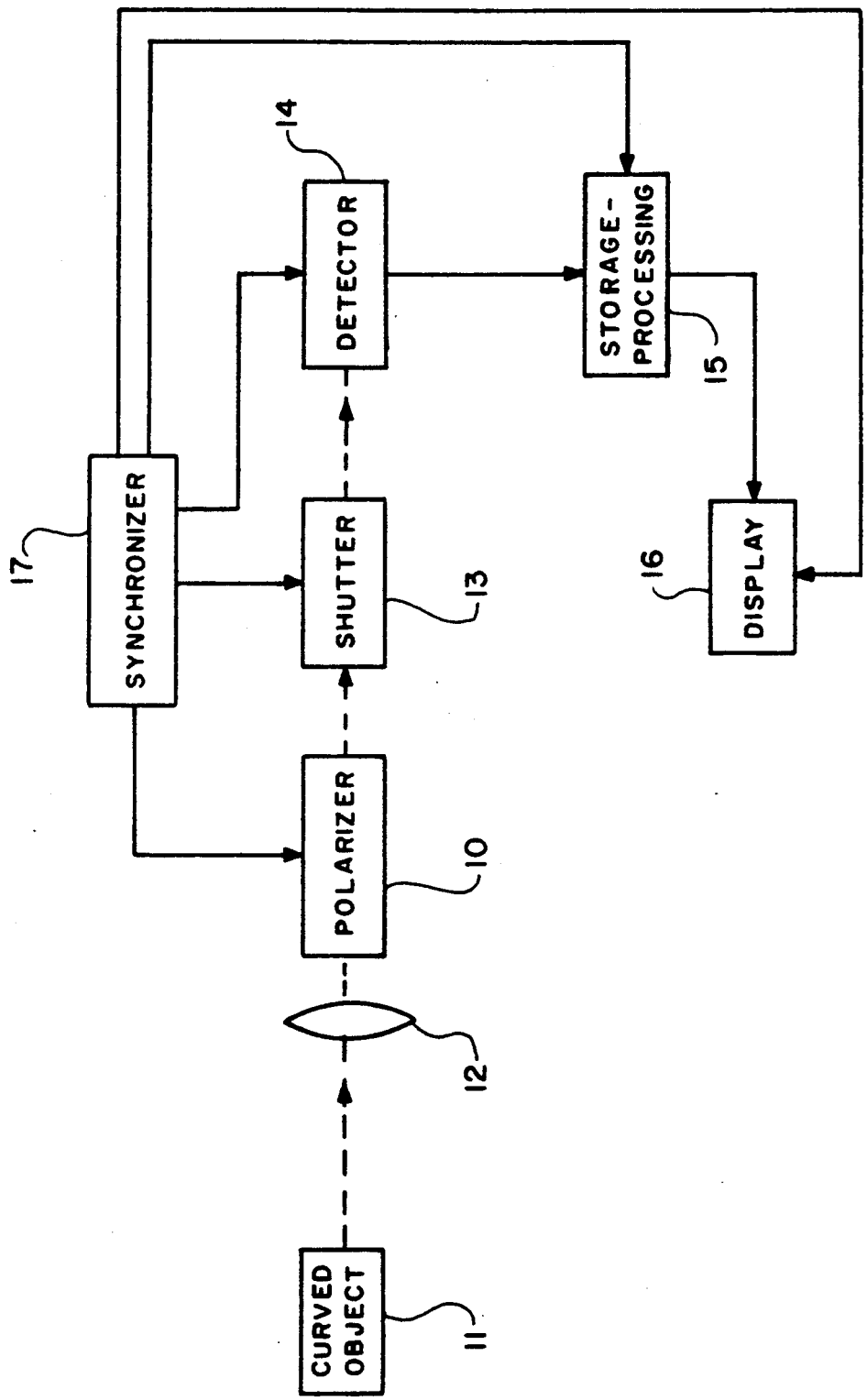
FIG. 2 is a block diagram of an apparatus capable of practicing the inventive method.

FIG. 2 schematically shows an apparatus for performing the method of the invention, and includes polarizer 10 which passes one polarization of infrared energy omitted by a curved object 11 emitting infrared energy and directed onto 10 by lens 12. Although not shown, it should be understood that a cluttered background may surround or partly obscure object 11. Polarizer 10, for infrared, may be a CdTe crystal surface from which the radiation of 11 is reflected at the Brewster angle. In any event, the polarized radiation from 10 passes through shutter 13 to detector 14. This detector may take any one of several different forms, such as a photodiode scanned over the scene containing the object, a FLIR, or an infrared vidicon. The output of 14 passes to storage and processing device. 15. For a detector with a single photodiode, the storage may be performed by nothing more complex than a shift register for each polarization field, and the processing may be done by a comparator for the shift registers. For a television type of detector a magnetic tape or disc may be used, with the two fields recorded on separate tracks (or segments of tracks) and with heads for simultaneously reading out both tracks. The output of 15 passes to display 16, which may be a cathode ray tube or other display device. All of 10, 13, 14, 15, and 16 are synchronized in their operation by synchronizer 17. For the case of an infrared television camera for detector 14, the synchronizer will be the normal television synchronization generator. Obviously, shutter 13 is not needed for a television system. Polarizer 10 may be a crystal rotated by a stepping motor, or may be an electro-optical device such as a Kerr cell.

Although this disclosure is directed to a method and apparatus for infrared radiation, images of bodies which omit visible radiation could be enhanced in like manner. An example of such a body is a red-hot gun barrel.

I claim:
1. A method of producing an enhanced image, compared to an unpolarized, polarized, or partially polarized image, from infrared radiation of a curved object in an infrared field, including the following steps:
   detecting and storing a first image from an infrared field including such an object for a particular polarization of the infrared radiation therefrom;
   detecting and storing a second image from said field including said object for another particular polarization of the infrared radiation therefrom;
   combining said stored images to produce said enhanced image and;
   displaying said enhanced image.
2. The method as set forth in claim 1 wherein said images are combined by taking the difference therebetween.
3. The method as set forth in claim 1 wherein said images are combined by taking the sum thereof.
4. A device for producing an enhanced image, compared to an unpolarized, polarized, or partially polar- ized image, from infrared radiation of a curved object in an infrared field of view, including:

means for alternately providing different polarizations of the radiation from said field of view;

means for detecting images from said means for providing;

means for storing and combining alternate pairs of images to provide a composite image;

and means for displaying said composite image.

* * * * *